UNITED STATES PATENT OFFICE.

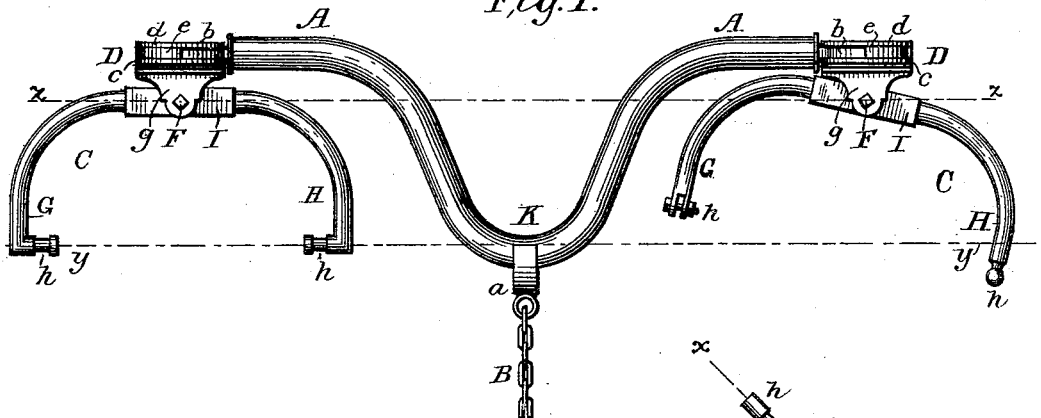
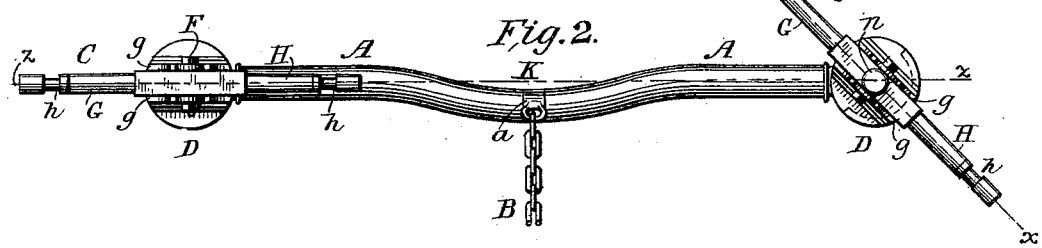
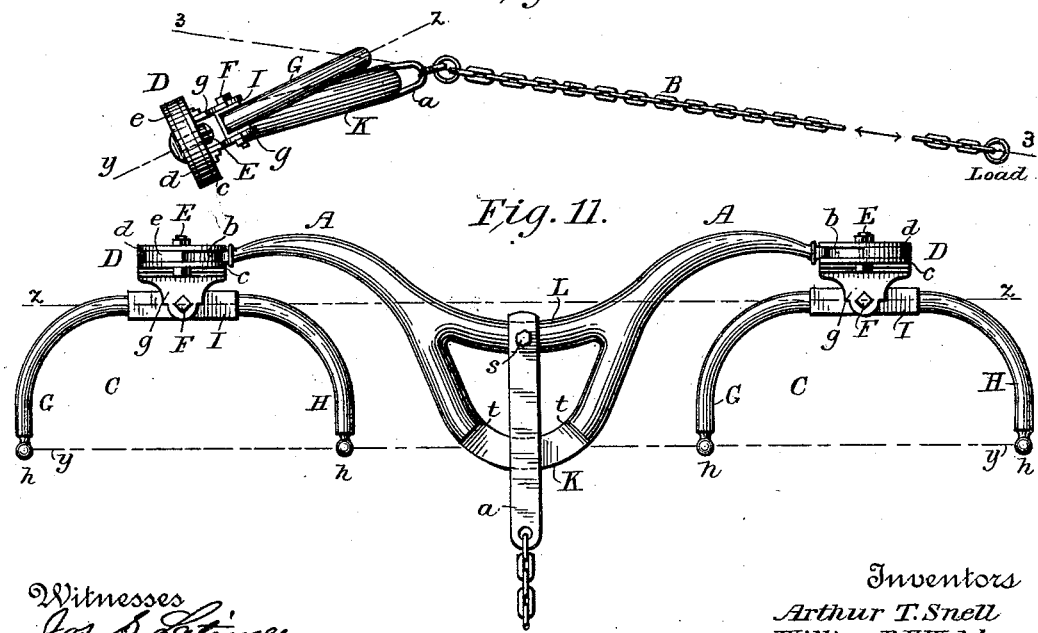

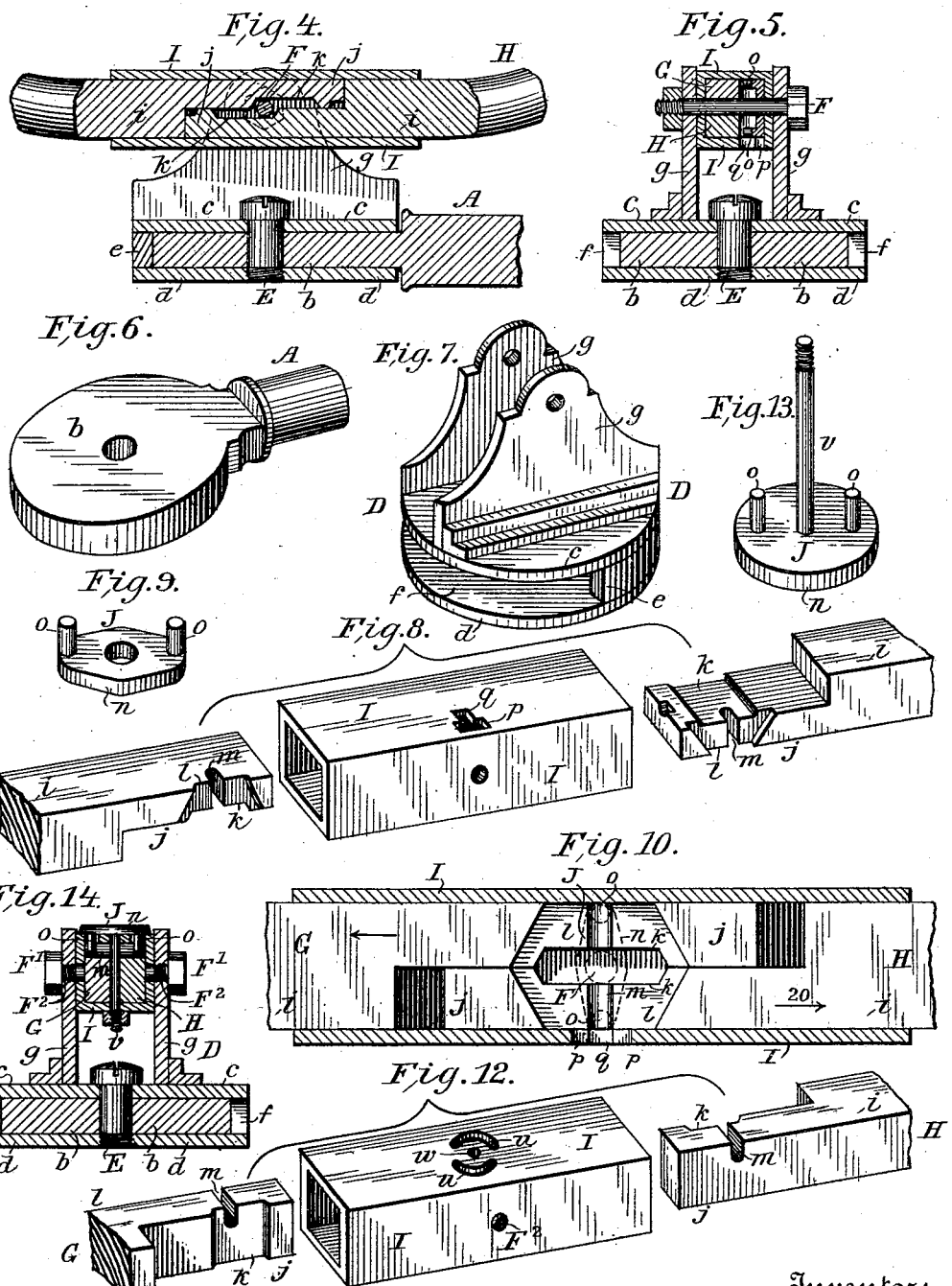

ARTHUR T. SNELL, OF WEST SATICOY, AND WILLIAM R. H. WELDON, OF VENTURA, ASSIGNORS TO SNELL & WELDON, OF SANTA BARBARA, CALIFORNIA.

HARNESS.

SPECIFICATION forming part of Letters Patent No. 500,516, dated June 27, 1893.

Application filed August 31, 1892. Serial No. 444,683. (No model.)

*To all whom it may concern:*

Be it known that we, ARTHUR T. SNELL, of West Saticoy, and WILLIAM R. H. WELDON, of Ventura, county of Ventura, State of California, have invented certain new and useful Improvements in Harness, of which the following is a specification.

This invention relates to improvements in that class of draft harness for double teams wherein a cross-yoke extending in front of the breasts of a pair of draft animals is connected to the load, and is itself connected by suitable breast-yokes at either end to the hames or collars of the horses, the connecting device between the cross-yoke and the load being attached centrally to the cross-yoke between the breast-yokes.

The improved harness is made entirely of metal, and its merits and novel features will be set forth in connection with the following detailed description and in the claims.

The improved harness is illustrated in the accompanying drawings, wherein—

Figure 1, is a plan view of the improved harness. Fig. 2 is a rear view thereof. Fig. 3, is a side view thereof. Fig. 4, is a longitudinal horizontal section on an enlarged scale through the joint between one end of the cross-yoke and the breast-yoke connected therewith. Fig. 5, is a cross-section thereof. Fig. 6, is a perspective view of one end of the cross-yoke showing the construction of the bearing plates thereof. Fig. 7, is a detail perspective view of the swiveled bearing-box constituting the connection between the cross-yoke and each breast yoke. Fig. 8, is a detail view in perspective of the ends of each breast-yoke and the sleeve in which they slide. Fig. 9, is a detail perspective view of the reversing lever. Fig. 10, is a section through the breast-yoke sleeve just below one wall thereof, showing the action of the reversing mechanism. Fig. 11, is a view showing a modified construction of the cross-yoke. Figs. 12 and 13, are views similar to Figs. 8, and 9, respectively, illustrating a modification of the reversing mechanism. Fig. 14, is a cross-section, similar to Fig. 5, illustrating the modification shown in Figs. 12, and 13. Figs. 4 to 10 inclusive, and Figs. 12, 13, and 14, are drawn to a larger scale than that of Figs. 1, 2, 3, and 11. The scale of Figs. 4, 5, 6, 7, 8, 12, and 14, is twice, and of Fig. 9, 10, and 13, four times, that of Figs. 1, 2, 3, and 11.

A, is the cross-yoke, which is of proper size and construction to extend across and in front of the breasts of a pair of draft animals, said cross-yoke having at its center a coupler $a$ for connection with the draft chain B, and having at each of its opposite ends a circular bearing plate $b$, as shown most clearly in Fig. 6. This cross-yoke with its coupler $a$, and plates $b$, is made of metal, and preferably the coupler $a$ and plates $b$ are either integral with the cross-yoke or permanently secured thereto by brazing or otherwise. The body of the cross yoke may be either of metal tubing or formed from a solid rod or bar.

Each end of the cross-yoke carries a breast-yoke C. Each breast yoke is coupled to the end of the cross-yoke by a species of universal joint, so that the breast-yoke may tilt in one direction and swing in a second direction. The universal joint between each breast-yoke and its end of the cross-yoke is effected by means of a bearing box D (see Fig. 7), which turns upon the bearing plate $b$ and to which the breast-yoke is pivoted.

The bearing box D, consists of two separate parallel circular plates $c\ d$, connected at their peripheries by a semi-circular rim $e$, so that the plates $c\ d$ are connected throughout about one-half of their circumferences, and an open space or slot $f$ is left at their peripheries throughout the remainder of their circumference. The bearing-box is slipped over the bearing-plate $b$, which enters the semi-circular slot $f$, the plates $c\ d$ being thus disposed on either side of the plate $b$. A bolt E, extending centrally through the plates $b\ c\ d$ constitutes the axis on which the bearing-box D, turns. The plates $b\ c\ d$ give extended bearing surfaces, and prevent the bearing box tilting on its axis, thereby causing said box to turn in a definite plane and relieving the pivot bolt E, of strain. The edges of the rim $e$ coming in contact with the union between the bearing-plate $d$ and cross-yoke A, limit the movement of the bearing-box in either direction. From the plate $c$ of box D, extend two parallel perpendicular ears $g$ $g$ on either side of the axis E, which ears are also parallel with a line $x$—$x$ extending through the axis E, and bi-secting both the rim $e$ and slot $f$. These ears $g$ $g$ near their outer ends support and form journals for the pivot bolt F, of the breast-yoke C. The axis F is consequently perpendicular to axis E, and at right-angles to the line $x$—$x$. The plates $c$ $d$, rim $e$, and ears $g$ $g$ of the bearing-box D, are all of metal and are permanently united together.

Each breast-yoke C, is, as a whole, approximately a semi-circle, with its center portion pivoted to the bearing-box D, and with its two curved arms G H extending backwardly therefrom and terminating in suitable couplings $h$ $h$ for attachment to the hames on the neck of the draft animal. The couplers $h$ $h$ are such as to form a pivotal connection with the hames, and three forms of coupler are shown in the drawings, of which the ball form is preferred.

In its preferred form, each breast-yoke is composed of three principal parts, the two arms G and H, each carrying a coupler $h$ at its outer end, and a coupling sleeve I, in which the inner ends of the arms G, H, enter and slide. The arms G and H, slide back and forth within the sleeve I, to a limited extent, so that the outer ends of the arms G and H are adjustable to and from each other, whereby the breast yoke can be adapted to animals of different sizes. Preferably the arms G, and H, are so connected within the sleeve I, that when one arm is moved in one direction the other will move automatically in the opposite direction. The mechanism for effecting the opposite movement of the two arms G, and H, we term a "reversing mechanism."

The preferred reversing mechanism is illustrated more particularly in Figs. 8, 9, and 10. The hollow sleeve I, is preferably square in cross-section and of uniform size throughout its length. Where each arm G, or H, enters the sleeve (at $i$, see Fig. 8) the arm also is square in cross-section, this squared guiding section $i$ of each arm fitting neatly within the sleeve I, whereby it is guided therein and the arm is maintained in proper position. The extreme inner end or section $j$ of each arm G, or H, is reduced to one-half the size of the guiding section $i$, so that the two inner sections $j$ of the two arms G, and H, overlap each other and slide by each other. The two sections $j$ $j$ of the two arms G, and H, lie on opposite sides of the pivot-bolt F, and to accommodate the bolt each section has a longitudinal recess $k$ on its inner face, the two recesses being opposite each other. The lengths of the recesses $k$ limit the extent of the sliding movement of the arms G, and H. On one of its sides each section $j$ has a shallow recess $l$ and an open slot $m$ at the center of this recess. The reversing lever J, consists of a centrally-apertured plate $n$, through the aperture of which the bolt F, passes, so that the plate $n$ swings on said bolt, and of two studs $o$ $o$ which project from the inner face of said plate $n$ on opposite sides of the central aperture of the plate. The lever plate $n$ lies in the recesses $l$ of the two arms G and H, with one of the studs $o$ entering the slot $m$ on one of the arms G, and its other stud entering the slot $m$ of the other arm H. The operation of the reversing mechanism will be best understood by reference to Fig. 10, wherein the reversing lever and the pivot bolt are shown in dotted lines. This figure shows the arms G, and H, occupying an intermediate position, with the slots $m$ $m$ directly in line with each other. Assume now that the arm H (the lower arm in this figure) is moved outwardly in the direction of the arrow 20. The margin of lower slot $m$ then comes in contact with lower stud $o$, thus causing plate $n$ to rock on its axis F, and causing upper stud $o$ to come in contact with the margin of upper slot $m$, thereby moving arm G, in a direction opposite to arrow 20. To entirely separate arms G, and H, from each other and remove them from the sleeve I, a T-shaped aperture is formed in the bottom of sleeve I, having wide portion $p$ and narrow portion $q$ (see Figs. 8, and 10). The parts are brought into the position shown in Fig. 10. The bolt F is first removed, and the reversing lever then falls out through the T-shaped slot, the plate $n$ passing through wide portion $p$ of the slot, and the studs $o$ through narrow portion $q$.

The breast yokes and all parts connected therewith are composed of metal, the arms G, and H, being preferably hollow throughout the greater portion of their length.

The central portion of the cross-yoke A, is bowed backwardly, as shown in Fig. 1, the coupling $a$ for the draft chain B, being located at the bend K of the bow at its extreme backward point. If a line $y$—$y$ is drawn parallel with a line $z$—$z$ connecting the axes F F on which the breast-yokes C C tilt (see Fig. 1), said line $y$—$y$ passing through both hame couplings $h$ $h$ of one of the breast yokes when the latter is balanced on its axis as shown in Fig. 1, then the central bow K of the cross-yoke should extend so far back that the coupling $a$ shall be back of the line $y$—$y$. Assuming also that a plane (indicated by line $y$—$z$ in Figs. 2, and 3) is passed through the lines $y$—$y$ and $z$—$z$, then the bow is also bent downwardly (as shown in Figs. 2, and 3) so that the chain coupling $a$ is below the plane of said lines, and consequently below the plane of the hame couplings $h$ $h$ and of the axes F, F. The reasons for thus locating the point of connection between the cross-yoke and the draft device back of and below the line $y$—$y$, are as follows:—When no load is being pulled, the cross-yoke A, and breast-yokes C, C, hang downward against the collars of the draft animals, the pivotal connections between the breast yokes and hames or collars permitting them to do so. When, however, a load is connected to the chain B, constituting the draft device, the cross-yoke acts as a lever, the load being the power, and the pivotal connections between the breast-yokes and hames (lying in the line y—y) being the fulcra. The load being applied to the connection a between the draft-chain B, and cross-yoke A, causes the latter to swing on the fulcra until the point of connection between the chain and cross-yoke and the axes of the couplers h h are brought into coincidence with the line of draft which is indicated by the line 3—3 in Fig. 3. When this position is assumed the cross-yoke and breast-yokes are maintained in the position shown in Fig. 3, with the breast-yokes standing out in front of and away from the breasts of the draft animals. Consequently, when the animals are at work they are relieved from contact with any part of the metal harness, chafing being thus prevented. By inclining the cross-yoke downwardly (the word "downwardly" and other words indicating direction being here, as elsewhere, used relatively only and on the assumption that the breast-yokes are horizontal when not in use and being described) from the breast-yokes, the cross-yoke lies in an inclined position below the plane of the line of draft (see Fig. 3), so that the breast-yokes stand out and their front ends are not elevated as would be the case if they and the cross-yoke occupied the same plane.

The turning of the breast-yokes C, C, on the axes E E, permits the harness to be used with a pair of animals unmatched in height, and also when one of the animals travels upon a greater elevation than the other, as when plowing on a hillside. In Fig. 2, the two breast-yokes are shown occupying different positions on their axes E.

The tilting of the breast-yokes on the axes F F, gives to each animal considerable independent freedom of motion. In Fig. 1, the two breast-yokes are shown occupying different positions on their axes F.

This improved harness is made entirely of metal, and does away with poles, whiffletrees, tugs, and the greater part of the leather harness. It is useful in hauling, for agricultural implements, for street-cars, and for many other purposes. The cross-yoke A, also acts as an equalizer, thereby placing upon each animal its share of the work.

Numerous modifications can be made in details of construction without departing from the principles of the invention. For example, as shown in Fig. 11, the coupling a for the draft chain B, need not be rigidly attached to the bend or bow K, of the cross-yoke A. In Fig. 11, the cross-yoke is formed with a through-bar L, and bow K, said bow not extending beyond the line y y, and the draft-coupling a is a bar pivoted at s to the through-bar L, and resting upon the bow K, which has shoulders t t to limit the swing of the bar a. The point of connection of the bar or coupling a with the draft chain B, in Fig. 11, has exactly the same relations with the cross-yoke and breast yokes as in Figs. 1, 2, and 3.

Figs. 12, 13, and 14, illustrate a modification of the reversing mechanism for the arms G, and H, of the breast-yokes. The plate n of the reversing lever J (see Figs. 13 and 14) is outside of the sleeve I, and its studs o o co-operate with the slots m m of the arms G, and H, by passing through curved slots u u in the top of the sleeve I. The lever J, in this instance does not swing on the axis F, but has a special axis or spindle v, which turns in apertures w (see Figs. 12, and 14) in the top and bottom of the sleeve I. In this modification the bolt F, on which the breast-yoke tilts cannot extend through the sleeve, and accordingly two short screw bolts F', are employed, which extend through the apertures of the ears g on the swiveled box D, which are threaded to receive them (see Fig. 14), and enter apertures F², in the sleeve I. In Fig. 2, the breast yoke which is swung out of the plane y—z is shown as provided with this modified reversing mechanism.

We claim as our invention—

1. A cross-yoke adapted to extend in front of the breasts of a pair of draft-animals, in combination with two breast-yokes connected with said cross-yoke at or near the ends thereof and extending backwardly from said cross-yoke, each breast-yoke at its rear being adapted to be connected with the collar (or the hames thereof) of a draft-animal, and said cross-yoke having at its middle between said breast-yokes a portion which extends behind its ends and back of the points of connection between said breast-yokes and said collar and is there provided with a draft-coupling, substantially as set forth.

2. A cross-yoke adapted to extend in front of the breasts of a pair of draft-animals, in combination with two breast-yokes connected with said cross-yoke at or near the end thereof and extending backwardly from said cross-yoke, each breast-yoke at its rear being adapted to be connected with the collar (or the hames thereof) of a draft-animal, and said cross-yoke having at its middle between said breast-yokes a portion which extends downwardly below the points of connection between said breast-yokes and said collar and is there provided with a draft-coupling, substantially as set forth.

3. A cross-yoke adapted to extend in front of the breasts of a pair of draft-animals, in combination with two breast-yokes connected with said cross-yoke at or near the ends thereof and extending backwardly from said cross-yoke, each breast-yoke at its rear being adapted to be connected with the collar (or the hames thereof) of a draft-animal, and said cross-yoke having at its middle between said breast-yokes a portion which extends rearwardly and downwardly behind and below the points of connection between said breast-yokes and said collar and is there provided with a draft-coupling, substantially as set forth.

4. The combination of a cross-yoke adapted to extend in front of the breasts of a pair of draft-animals, and breast-yokes connected to said cross-yoke at or near its ends and extending back of the same, each of said breast-yokes being adapted to be connected at its rear ends with the collar (or the hames thereof) of a draft-animal, the middle part of said cross-yoke between said breast-yokes inclining backwardly and downwardly back of and below its ends and back of and below the connections of the breast-yokes with the collar, and being provided at its said middle portion and at the extreme backward and downward part thereof with a draft-coupling, substantially as set forth.

5. The combination of a cross-yoke adapted to extend in front of the breasts of a pair of draft-animals, and breast-yokes connected to said cross-yoke at its ends and extending back of the same, each of said breast-yokes being adapted to be connected at its rear ends with the collar (or the hames thereof) of a draft-animal, the middle part of said cross-yoke between said breast-yokes being bowed backwardly and downwardly back of and below its ends and back of and below the connections of the breast-yokes with the collar, and said cross-yoke being provided at the extreme backward and downward part of its bowed portion with a draft-coupling, substantially as set forth.

6. The cross-yoke having bearing-plate $b$, in combination with bearing-box D, swiveled to said plate $b$ to turn thereon, and the breast-yoke pivotally connected with said box D, substantially as set forth.

7. The cross-yoke having bearing-plate $b$, in combination with bearing-box D, swiveled to said plate $b$ to turn thereon on the axis E, and the breast yoke pivotally connected with said bearing-box to turn on the axis F, said axes E, and F, being perpendicular to each other, substantially as set forth.

8. The cross-yoke having at each end a bearing-plate $b$, in combination with bearing-box D swiveled to said plate $b$, having plates $c$ and $d$ above and below the plate $b$, rim $e$ and slot $f$, and a breast-yoke carried by said bearing-box, substantially as set forth.

9. The cross-yoke having at each end a bearing-plate, in combination with the bearing-box D, having axis E connecting it with said bearing-plate, plates $c$ and $d$ on either side of said bearing-plate, rim $e$, slot $f$, and ears $g$ $g$ on either side of axis E parallel with each other and with a plane passing through axis E and bisecting rim $e$ and slot $f$, and a breast-yoke pivoted to and between said ears $g$ $g$, substantially as set forth.

10. The cross-yoke, in combination with two breast-yokes connected therewith, each of said breast-yokes having two arms the ends of which are adapted to be connected with the collar (or the hames thereof) of a draft-animal on opposite sides of the neck of the animal, and said two arms of each breast-yoke being adjustable to and from each other, substantially as set forth.

11. In a breast-yoke of a harness, the central sleeve I, in combination with the arms G, and H, entering said sleeve and movable to and from each other, said arms having recesses $m$ $m$ respectively, and a lever J, pivoted to said sleeve and having studs $o$ $o$ on opposite sides of the pivot entering said slots $m$ $m$ respectively, substantially as set forth.

12. In a breast-yoke of a harness, the central sleeve I, in combination with arms G, and H, entering said sleeve and movable to and from each other, said arms having reduced overlapping ends $j$ $j$ and slots $m$ $m$ respectively, and a lever J pivoted to said sleeve and having studs $o$ $o$ on opposite sides of the pivot entering said slots $m$ $m$ respectively, substantially as set forth.

13. In a breast-yoke of a harness, the central sleeve I, in combination with arms G, and H, entering said sleeve and movable to and from each other, said arms having reduced overlapping ends $j$ $j$ with recesses $k$ $k$ respectively which face each other, and a lever J, the spindle or bolt of which is carried by said sleeve I and extends through said recesses $k$ $k$, substantially as set forth.

14. In a breast-yoke of a harness, the central sleeve I, in combination with arms G and H entering said sleeve and movable to and from each other, said arms having overlapping ends $j$ $j$ each of which has a recess $l$ and slot $m$, and a lever J pivoted within said sleeve occupying said recesses $l$ and having studs $o$ $o$ on opposite sides of its pivot engaging said slots $m$ respectively, substantially as set forth.

15. In a harness having a cross-yoke and breast-yokes, the tilting sleeve I of each breast-yoke, and the bolt or spindle F passing therethrough on which said sleeve tilts, said bolt or spindle being supported through suitable connections by the cross-yoke, in combination with the arms G and H, of the breast-yoke extending within said sleeve, and a reversing lever within said sleeve pivoted concentric to said spindle F and co-operating with said arms G and H to move the same, substantially as set forth.

16. In the breast-yoke of a harness, the sleeve I, having a slot with parts $p$ $q$, and movable arms G and H extending into said sleeve, in combination with lever J for moving said arms having plate $n$ and studs $o$ $o$, said lever being inserted within said sleeve through said slot $p$ $q$ the plate $n$ passing through part $p$ and the studs $o$ $o$ through part $q$, substantially as set forth.

In testimony that we claim the invention above set forth we affix our signatures in presence of two witnesses.

ARTHUR T. SNELL,
WILLIAM R. H. WELDON.

Witnesses:
W. H. WILDE,
ARTHUR L. WEBB.